United States Patent
Aoyagi

(10) Patent No.: US 8,611,860 B2
(45) Date of Patent: Dec. 17, 2013

(54) RADIO BASE STATION OPERATING BETWEEN CLOSED STATE AND SEMI-OPEN STATES FOR PROVIDING ACCESS

(75) Inventor: Kenichiro Aoyagi, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 370 days.

(21) Appl. No.: 12/937,045

(22) PCT Filed: Apr. 8, 2009

(86) PCT No.: PCT/JP2009/057223
§ 371 (c)(1),
(2), (4) Date: Jan. 3, 2011

(87) PCT Pub. No.: WO2009/125799
PCT Pub. Date: Oct. 15, 2009

(65) Prior Publication Data
US 2011/0105085 A1    May 5, 2011

(30) Foreign Application Priority Data

Apr. 8, 2008   (JP) ................................ 2008-100877

(51) Int. Cl.
*H04M 1/66*   (2006.01)
*H04W 72/00*  (2009.01)
*H04W 4/00*   (2009.01)
*H04B 1/38*   (2006.01)

(52) U.S. Cl.
USPC ............ 455/411; 455/453; 455/561; 370/328

(58) Field of Classification Search
USPC ............... 455/41.2, 410–411, 415, 423–425, 455/432.3, 433–434, 435.1–435.3, 446, 455/450, 452.1–452.2, 453, 500, 509–510, 455/512–515, 550.1, 556.2, 558, 560–561, 455/418–420, 422.1, 436, 438, 440, 444; 370/328–329, 332, 338, 341, 346, 331
See application file for complete search history.

(56) References Cited

U.S. PATENT DOCUMENTS

| | | | |
|---|---|---|---|
| 6,801,772 B1 * | 10/2004 | Townend et al. ............. | 455/436 |
| 6,912,388 B2 * | 6/2005 | Yang .......................... | 455/432.1 |
| 6,983,153 B2 * | 1/2006 | Jain et al. ..................... | 455/453 |
| 7,873,351 B2 * | 1/2011 | Yahagi ......................... | 455/411 |

(Continued)

FOREIGN PATENT DOCUMENTS

| | | |
|---|---|---|
| JP | 3-107218 | 5/1991 |
| JP | 2004 72157 | 3/2004 |
| WO | 2005 112490 | 11/2005 |

OTHER PUBLICATIONS

Japanese Office Action issued Jul. 17, 2012, in Japan Patent Application No. 2010-507261 (with English translation).

(Continued)

*Primary Examiner* — Meless Zewdu
(74) *Attorney, Agent, or Firm* — Oblon, Spivak, McClelland, Maier & Neustadt, L.L.P.

(57) ABSTRACT

A mobile communication method including: operating a radio base station in a closed state which limits a mobile station allowed to make an access by establishing an access right or in a semi-open state which does not limit an access by a mobile station; and switching the state of the radio base station between the closed state and the semi-open state when a predetermined condition is satisfied.

11 Claims, 8 Drawing Sheets

(56) References Cited

U.S. PATENT DOCUMENTS

| | | | |
|---|---|---|---|
| 8,219,100 B2* | 7/2012 | Bao et al. | 455/444 |
| 2002/0035699 A1* | 3/2002 | Crosbie | 713/201 |
| 2002/0075844 A1* | 6/2002 | Hagen | 370/351 |
| 2004/0072565 A1 | 4/2004 | Nobukiyo et al. | |
| 2007/0054668 A1* | 3/2007 | Scheinert et al. | 455/435.1 |
| 2007/0202866 A1 | 8/2007 | Tsuchiya | |

OTHER PUBLICATIONS

International Search Report issued Jul. 21, 2009 in PCT/JP09/57223 filed Apr. 8, 2009.

Office Action issued Nov. 5, 2012, in Chinese Patent Application No. 200980112353.8 with English translation.

* cited by examiner

RADIO BASE STATION OPERATING BETWEEN CLOSED STATE AND SEMI-OPEN STATES FOR PROVIDING ACCESS

TECHNICAL FIELD

The present invention relates to a mobile communication method, a radio base station, a radio network controller, an exchange, and an integration device for allowing a mobile station to perform communication by accessing a radio base station.

BACKGROUND ART

In recent years, a closed-type radio base station (Closed Type) and an open-type radio base station (Open Type or Hybrid Type) have been considered as a small radio base station in a mobile communication system intended to be installed indoors such as a femto radio base station or a radio base station for home cell. The closed-type radio base station grants a right of access to the radio base station only to a mobile station belonging to a specific group or to a specific mobile station. The open-type radio base station does not provide access restriction against mobile stations.

The closed-type radio base station is intended to offer a high-speed communication service or an area restricted service by being used exclusively by a user of a specific mobile station (such as an owner of a home cell).

On the other hand, the open-type radio base station is intended to complementarily cover a communication coverage area mainly in a building, underground, or the like, as a usual radio base station covers.

Information as to whether each radio base station is the closed-type radio base station or the open-type radio base station is managed by the radio base station, a radio controller, an upstream management server, and the like.

Here, the radio base station can make the home cell characterized according to any purpose by notifying a mobile terminal of the information in the form of notification information or the like and by executing radio control processing based on the information.

However, in a home cell managed by a closed-type radio base station, a general mobile station not provided with the access right to the closed-type radio base station (the hole cell) cannot access the radio base station. Accordingly, there is a risk that communication in the home cell may constitute an interference wave for the communication by the general mobile station located in the vicinity of the home cell.

On the other hand, in a home cell managed by an open-type radio base station, there is a risk that a sufficient communication rate cannot be ensured for an owner who originally intends to use the home cell when numerous mobile stations access the radio base station (the home cell).

Accordingly, in a conventional mobile communication system, a communication common carrier has to design communication areas strictly in view of these circumstances. Hence there is a problem that it is not possible to deploy home cells flexibly on the initiative of users.

SUMMARY OF THE INVENTION

The present invention has been made in view of the foregoing problem and an object thereof is to provide a mobile communication method, a radio base station, a radio network controller, an exchange, and an integration device, which are capable of appropriately switching whether or not a radio base station is allowed to perform access control, for implementing flexible home cell deployment on the initiative of a user.

A first aspect of the present invention is summarized as a mobile communication method with which a mobile station performs communication by accessing a radio base station, comprise a step A of causing the radio base station to operate in any of a closed state of restricting a mobile station permitted for access by setting an access right, and a semi-open state of not restricting access by the mobile station and a step B of switching a state of the radio base station between the closed state and the semi-open state when a predetermined condition is met.

In the first aspect, wherein in the step B, the state of the radio base station is switched to the closed state when the number of mobile stations accessing the radio base station operating in the semi-open state exceeds a predetermined number, and in the step B, the state of the radio base station is switched to the semi-open state when the number of mobile stations accessing the radio base station operating in the closed state falls below a predetermined number.

In the first aspect, the mobile communication method further comprise a step C of counting the number of mobile stations that are located in a cell managed by the radio base station and in a cell around the cell and are provided with the access right to the radio base station, wherein in the step B, the state of the radio base station operating in the semi-open state is switched to the closed state when the number of the mobile stations exceeds a predetermined number, and in the step B, the state of the radio base station operating in the closed. state is switched to the semi-open state when the number of the mobile stations falls below a predetermined number.

In the first aspect, the mobile communication method further comprise a step D of observing a congestion state in the radio base station, wherein in the step B, the state of the radio base station operating in the semi-open state is switched to the closed state when occurrence of the congestion state in the radio base station is observed, and in the step B, the state of the radio base station operating in the closed state is switched to the semi-open state when termination of the congestion state in the radio base station is observed.

In the first aspect, wherein in the step B, when the state of the radio base station operating in the semi-open state is switched to the closed state, a mobile station accessing the radio base station and being provided with no access right to the radio base station is instructed to perform any of release of a radio link, a handover to a different cell, and location registration with a different cell.

A second aspect of the present invention is summarised as a radio base station, wherein the radio base station is configured to operate in any of a closed state of restricting a mobile station permitted for access by setting an access right and a semi-open state of not restricting access by the mobile station, the radio base station comprising a state switch configured to switch a state of the radio base station between the closed state and the semi-open state when a predetermined condition is met.

In the second aspect, wherein the state switch switches the state of the radio base station to the closed state when the number of mobile stations accessing the radio base station operating in the semi-open state exceeds a predetermined number, and the state switch switches the state of the radio base station to the semi-open state when the number of mobile stations accessing the radio base station operating in the closed state falls below a predetermined number.

In the second aspect, the radio base station further comprise a counter configured to count the number of mobile stations that are located in a cell managed by the radio base station and in a cell around the cell and are provided with the access right to the radio base station, wherein the state switch switches the state of the radio base station operating in the semi-open state to the closed state when the counted number of the mobile stations exceeds a predetermined number, and the state switch switches the state of the radio base station operating in the closed state to the semi-open state when the number of the mobile stations falls below a predetermined number.

In the second aspect, the radio base station further comprise an observation unit configured to observe a congestion state in the radio base station, wherein the state switch switches the state of the radio base station operating in the semi-open state, to the closed state when occurrence of the congestion state in the radio base station is observed, and the state switch switches the state of the radio base station operating in the closed state, to the semi-open state when termination of the congestion state in the radio base station is observed.

In the second aspect, wherein when switching the state of the radio base station operating in the semi-open state to the closed state, the state switch instructs a mobile station accessing the radio base station and being provided with no access right to the radio base station, to perform any of release of a radio link, a handover to a different cell, and location registration with the different cell.

A third aspect of the present invention is summarized as a radio network controller for housing a radio base station therein, wherein the radio network controller is configured to operate in any of a closed state of restricting a mobile station permitted for access by setting an access right and a semi-open state of not restricting access by the mobile station, the radio network controller comprising a state switch configured to switch a state of the radio base station between the closed state and the semi-open state when a predetermined condition is met.

A fourth aspect of the present invention is summarized as an exchange for housing a radio base station therein, wherein the exchange is configured to operate in any of a closed state of restricting a mobile station permitted for access by setting an access right and a semi-open state of not restricting access by the mobile station, the exchange comprising a state switch configured to switch a state of the radio base station between the closed state and the semi-open state when a predetermined condition is met.

A fifth aspect of the present invention is summarized as an integration device for housing a radio base station therein, wherein the integration device is configured to operate in any of a closed state of restricting a mobile station permitted for access by setting an access right and a semi-open state of not restricting access by the mobile station, the integration device comprising a state switch configured to switch a state of the radio base station between the closed state and the semi-open state when a predetermined condition is met.

BEST MODES FOR CARRYING OUT THE INVENTION (Configuration of Mobile Communication System According to First Embodiment of Present Invention)

A configuration of a mobile communication system according to a first embodiment of the present invention will be described with reference to FIG. 1 to FIG. 5.

Figure 1:
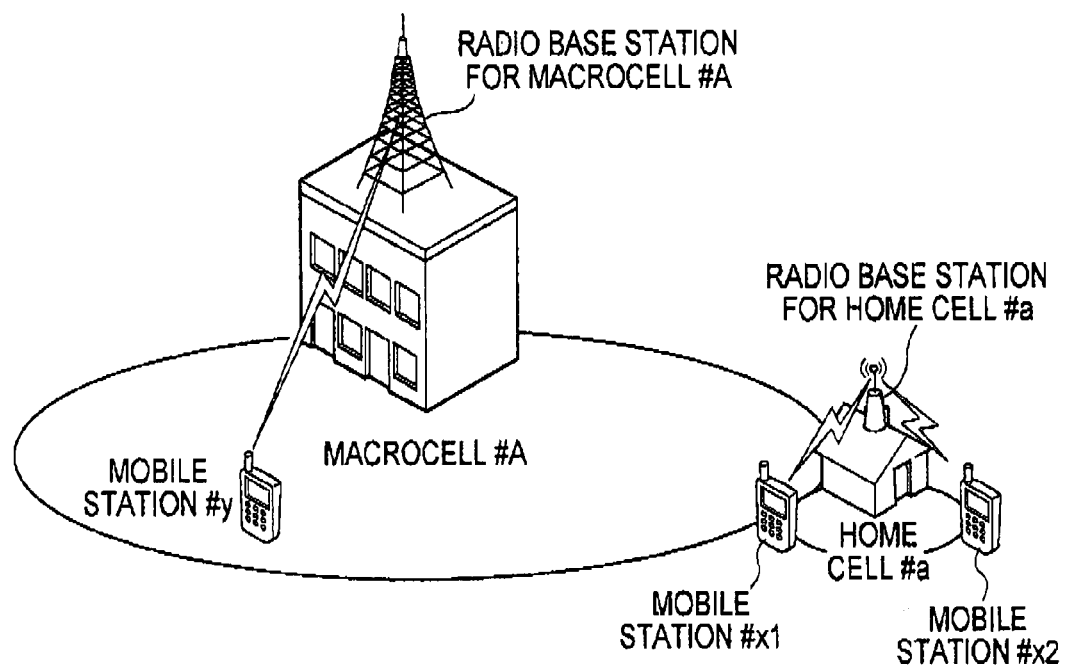
FIG. 1 is an overall configuration diagram of a mobile communication system according to a first embodiment of the present invention.

As shown in FIG. 1, a mobile communication system according to this embodiment includes a radio base station for macrocell #A configured to manage a macrocell #A, and a radio base station for home cell (a radio base station for femtocell) #a configured to manage a home cell #a.

This embodiment is based on assumptions that mobile stations #x1 and #x2 are provided with an access right to the radio base station for home cell #a (the home cell #a) and that a mobile station #y is not provided with the access right to the radio base station for home cell #a (the home cell #a). As a consequence, the radio base station for home cell #a is assumed to be able to offer a specific communication service such as a high-speed communication service to the mobile stations #x1 and #x2.

Figure 2:
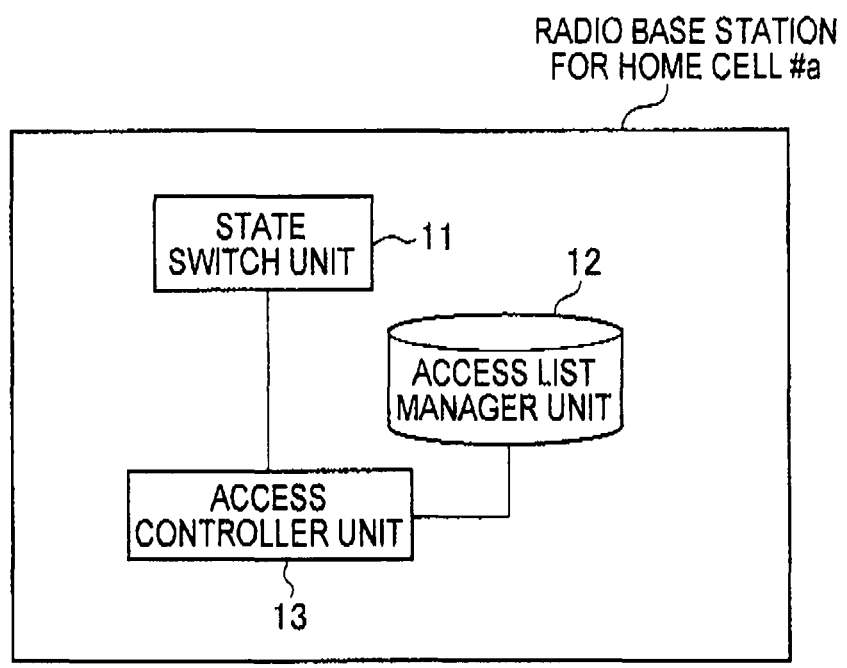
FIG. 2 is a functional block diagram of a radio base station for home cell according to the first embodiment of the present invention.

As shown in. FIG. 2, the radio base station for home cell #a includes a state switch 11, an access list manager 12, and an access controller 13.

The access list manager 12 is configured to manage an access list for setting up mobile stations to be permitted to access the radio base station for home cell #a.

The access controller 13 is configured to determine whether or not it is appropriate to permit access by a mobile station based on the access list managed by the access list manager 12.

Note that the radio base station for home cell #a is configured to operate either in a closed state (CLOSED state) configured to restrict mobile stations to be permitted for access by setting the access right or in a semi-open state (Semi-OPEN state or a Hybrid state) configured not to restrict access by the mobile stations.

Irrespective of the state of the radio base station for home cell #a, the mobile stations #x1 and #x2 are able to perform communication by accessing the radio base station for home cell #a, namely, by performing location registration processing with the radio base station for home cell #a and establishing a radio link with the radio base station for home cell #a.

On the other hand, when the radio base station for home cell #a is operated either in an open state or in the semi-open state, the mobile station #y is able to perform communication by accessing the radio base station for home cell #a, namely, by performing the location registration processing with the radio base station for home cell #a and establishing a radio link with the radio base station for home cell #a.

Figure 3:
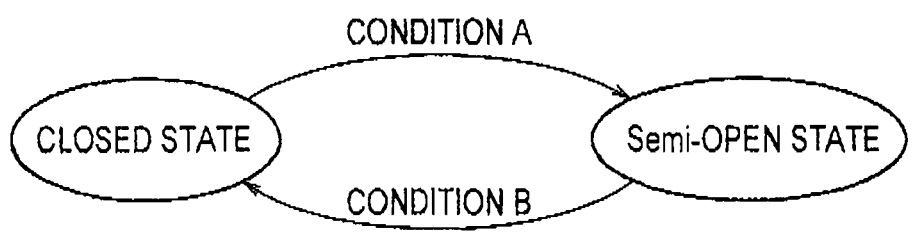
FIG. 3 is a state transition diagram of the radio base station for home cell according to the first embodiment of the present invention.

As shown in FIG. 3, the state switch 11 is configured to switch the state of the radio base station for home cell #a between the closed state and the semi-open state if a predetermined condition is met.

For example, the state switch 11 may be configured to switch the state of the radio base station for home cell #a to the closed state if the number of mobile stations accessing the radio base station for home cell #a operating in the semi-open state exceeds a predetermined number (i.e., if a condition B is met).

In the meantime, the state switch 11 may be configured to switch the state of the radio base station for home cell *a to the semi-open state if the number of mobile stations accessing the radio base station for home cell #a operating in the closed state falls below a predetermined number (i.e., if a condition A is met).

Meanwhile, the state switch 11 maybe configured to count the number of mobile stations, which are located in the cell managed by the radio base station for home cell #a and in cells around that cell and are provided with the access right to the radio base station for home cell #a.

In this case, the state switch 11 may be configured to switch the state of the radio base station for home cell #a operating in the semi-open state to the closed state if the counted number of the mobile stations exceeds a predetermined number (i.e., if the condition B is met).

In the meantime, the state switch 11 may be configured to switch the state of the radio base station for home cell #a operating in the closed state to the semi-open state if the counted number of the mobile stations falls below a predetermined number (i.e., if the condition A is met).

Meanwhile, the state switch 11 may be configured to observe a congestion state in the radio base station for home cell #a.

In this case, the state switch 11 may be configured to switch the state of the radio base station for home cell #a operating in the semi-open state to the closed state if occurrence of the congestion state in the radio base station for home cell #a is observed (i.e., if the condition B is met).

In the meantime, the state switch 11 may be configured to switch the state of the radio base station for home cell #a operating in the closed state to the semi-open state if termination of the Congestion state in the radio base station for home cell 4a is observed.

Here, a judgment as to whether or not any of the above-described predetermined conditions is met maybe carried out by a different device (such as a radio network controller RNC or an exchange MSC/SGSN) instead of the state switch 11.

In this case, the state switch 11 may be configured to switch the state of the radio base station for home cell #a between the closed state and the semi-open state based on notification of a judgment result from the different device.

Meanwhile, when the state of the radio base station for home cell #a operating in the semi-open state is switched to the closed state, the state switch 11 may be configured to instruct a mobile station accessing the radio base station for home cell #a and being not provided with the access right to the radio base station for home cell #a to perform either cancellation of the radio link or a handover to another cell (a cell using the same frequency or a cell using a different frequency).

Figure 4:
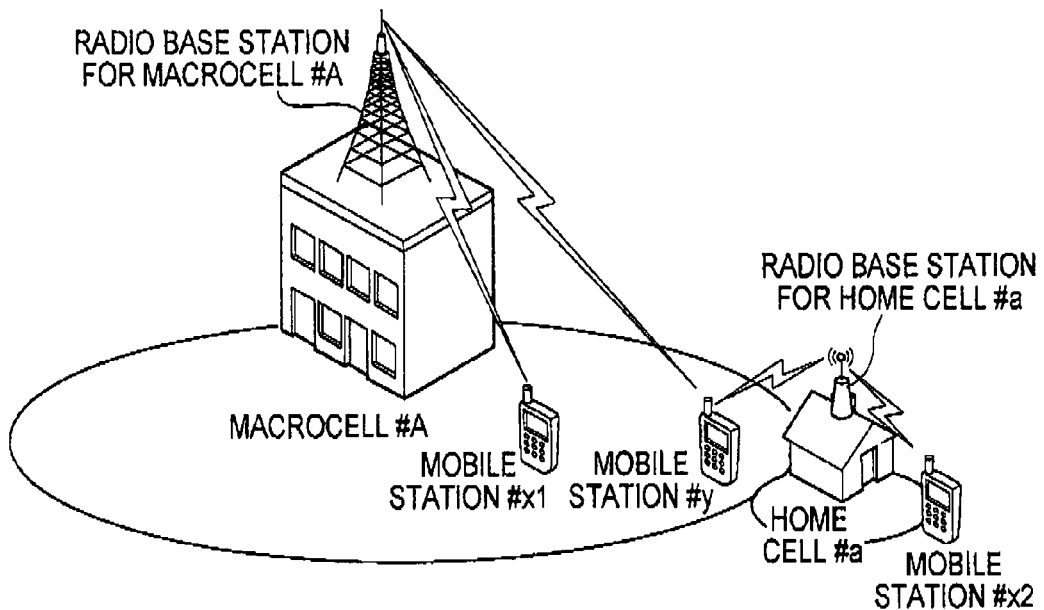
FIG. 4 is a view showing an example of a communication situation of the radio base station for home cell in a semi-open state in the mobile communication system according to the first embodiment of the present invention.

For example, if the mobile station #x1 moves away and only the mobile station #x2 is accessing the radio base station for home cell #a as shown in FIG. 4, the state switch 11 may switch the state of the radio base station for home cell #a to the semi-open state so that the mobile station #y can access the radio base station for home cell #a and establish the radio link when the mobile station #y is located in the vicinity of the home cell #a.

Figure 5:
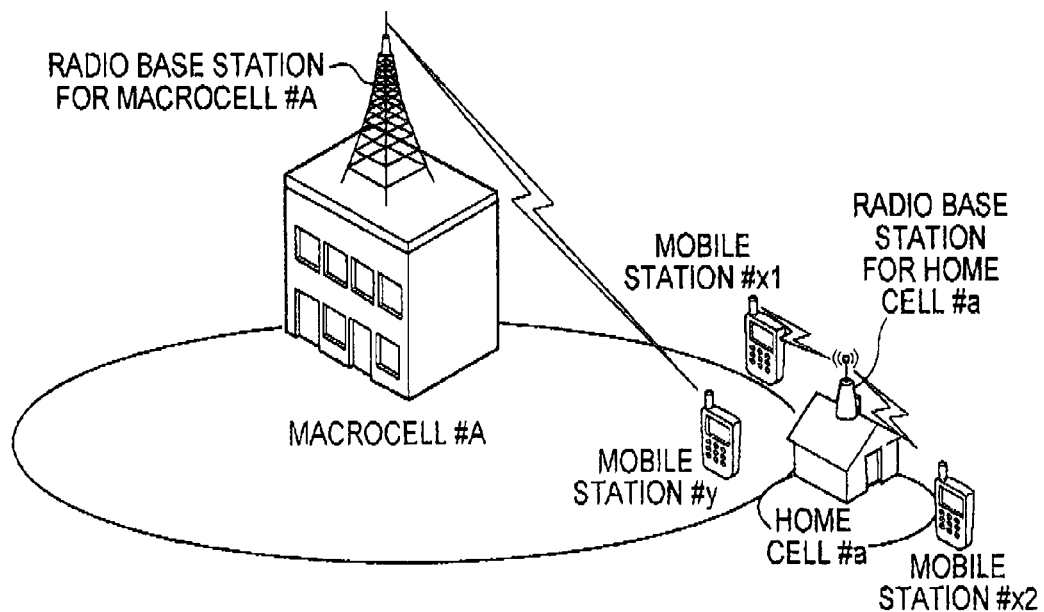
FIG. 5 is a view showing an example of a communication situation of the radio base station for home cell in a closed state in the mobile communication system according to the first embodiment of the present invention.

Meanwhile, when the mobile station #x1 comes back and only the mobile station #x2 accesses the radio base station for home cell #a as shown in FIG. 5, the state switch 11 is able to instruct cancellation of the radio link established between the radio base station for home cell #a and the mobile station #y or to instruct establishment of a radio link with the radio base station #A for the macrocell #A in the vicinity, and to switch the state of the radio base station for home cell #a to the closed state.

As a result, the mobile stations #x1 and #x2 provided with the access right to the radio base station for home cell #a can use the radio base station for home cell #a on a preferential basis while maintaining communication of the mobile station #y.

(Operations of Mobile Communication System according to First Embodiment of Present Invention)

Figure 6:
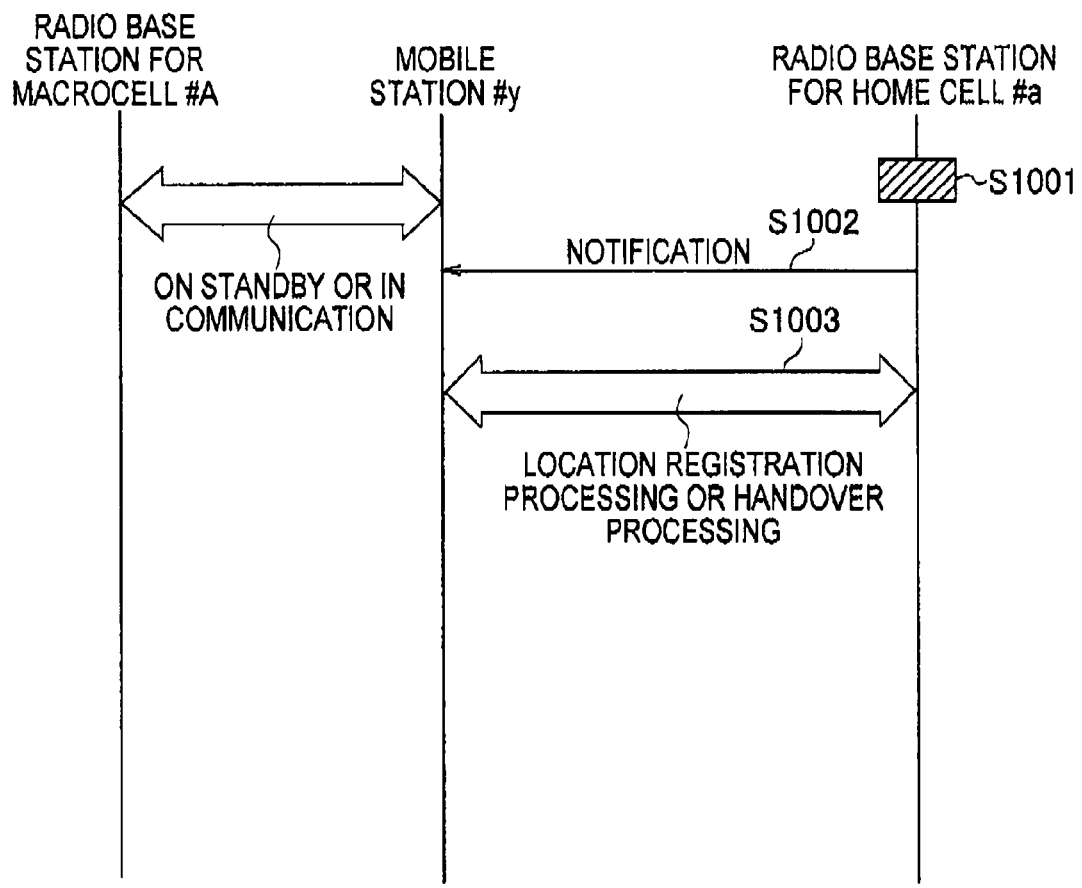
FIG. 6 is a sequence diagram showing an operation of the mobile communication system according to the first embodiment of the present invention.

Operations of the mobile communication system according to the first embodiment of the present invention will be described with reference to FIG. 6 and FIG. 7.

First of all, an operation of the mobile station #y when the state of the radio base station for home cell #a transitions from the closed state to the semi-open state will be described with reference to FIG. 6.

As shown in FIG. 5, the radio base station for home cell #a, which is operated in the closed state, transitions to the semi-open state in step S1001.

In step S1002, the radio base station for home cell #a notifies the transition to the mobile station #y either in communication in the macrocell #A or on standby in the macrocell #A in the form of notification information or the like.

In step S1003, the mobile station #y accesses the radio base station for home cell #a. Specifically, the mobile station #y either performs the location registration processing with the radio base station for home cell #a (starts standby in the home cell #a) or establishes the radio link with the radio base station for home cell #a (starts communication in the home cell #a).

Secondly, an operation of the mobile station #y when the state of the radio base station for home cell #a transitions from the closed state to the semi-open state will be described with reference to FIG. 7.

Figure 7:
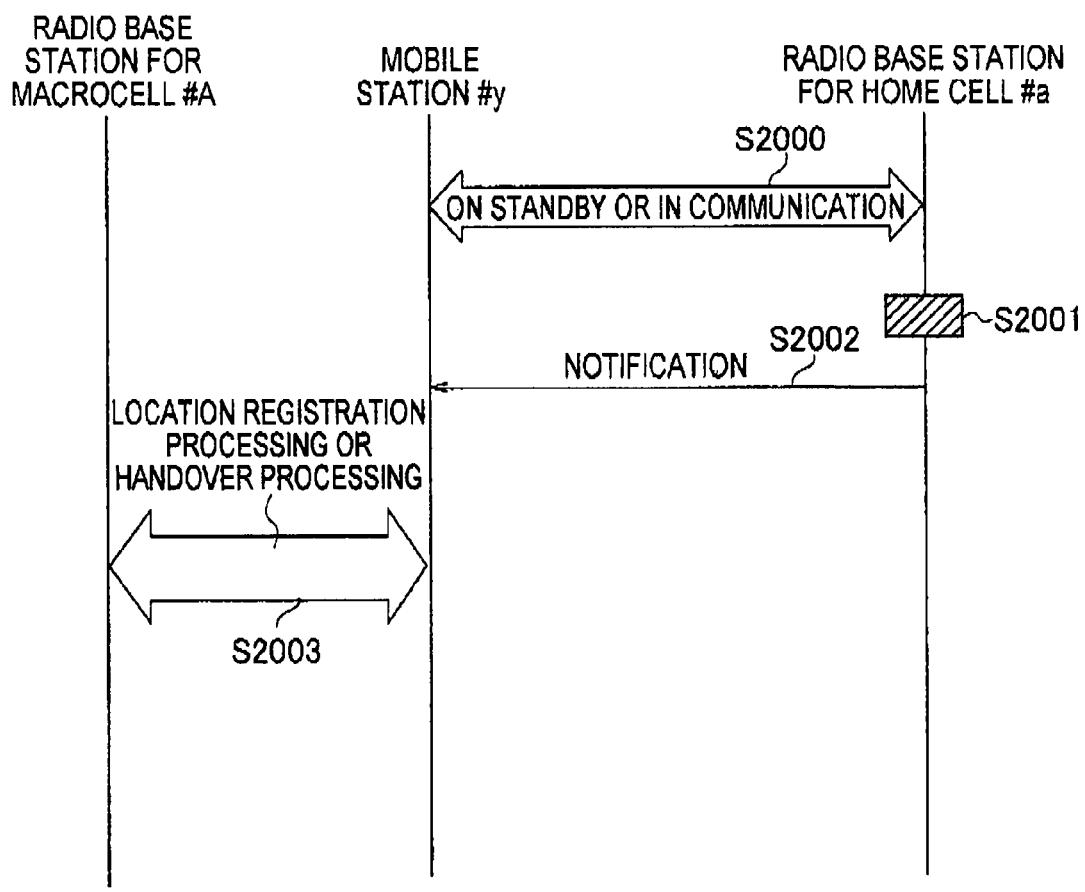
FIG. 7 is a sequence diagram showing an operation of the mobile communication system according to the first embodiment of the present invention.

As shown in FIG. 7, in step S2000, the mobile station #y is in communication in the home cell #a or on standby in the home cell #a.

In step S2001, the radio base station for home cell #a that is operated in the semi-open state transitions to the closed state.

In step S2002, the radio base station for home cell #a notifies the transition to the mobile station #y in the form of the notification information or the like.

In step S2003, the mobile station #y terminates the access to the radio base station for home cell #a. Specifically, the mobile station #y either performs the location registration processing with the radio base station for macrocell #A (starts standby in the macrocell #A), or cancels the radio link previously established with the radio base station for home cell #a and establishes the radio link with the radio base station for macrocell #A (performs a handover to the macrocell #A).

(Advantageous Effect of Mobile Communication System According to First Embodiment of Present Invention)

According to the mobile communication system of the first embodiment of the present invention, when the mobile station #x1 permitted to access the radio base station for home cell #a designed for exclusive use in a household or the like is not using the radio base station for home cell #a or when the radio base station for home cell #a still has an available capacity, it is possible to switch the radio base station for home cell #a automatically to the semi-open state so that the radio base station for home cell #a can be used by the mobile station #y which is not permitted to access the radio base station for home cell #a.

Therefore, when locating the home cell #a outside the macrocell #A, it is possible to offer a communication service designed for exclusive use while complementing a communication area (improvement in continuity of the communication service, improvement in communication quality, and the like) and thereby to reduce an influence on a radio capacity in public communication.

Moreover, according to the mobile communication system of the first embodiment of the present invention, when the radio base station for home cell #a is used for the public communication, it is also possible to notify the use to the mobile communication system and thereby to return a profit to the owner of the radio base station for home cell #a by way of payback and the like.

FIRST MODIFIED EXAMPLE

Now, a mobile communication system according to a first modified example of the present invention will be described with reference to FIG. 8 while focusing on differences from the above-described mobile communication system according to the first embodiment.

Figure 8:
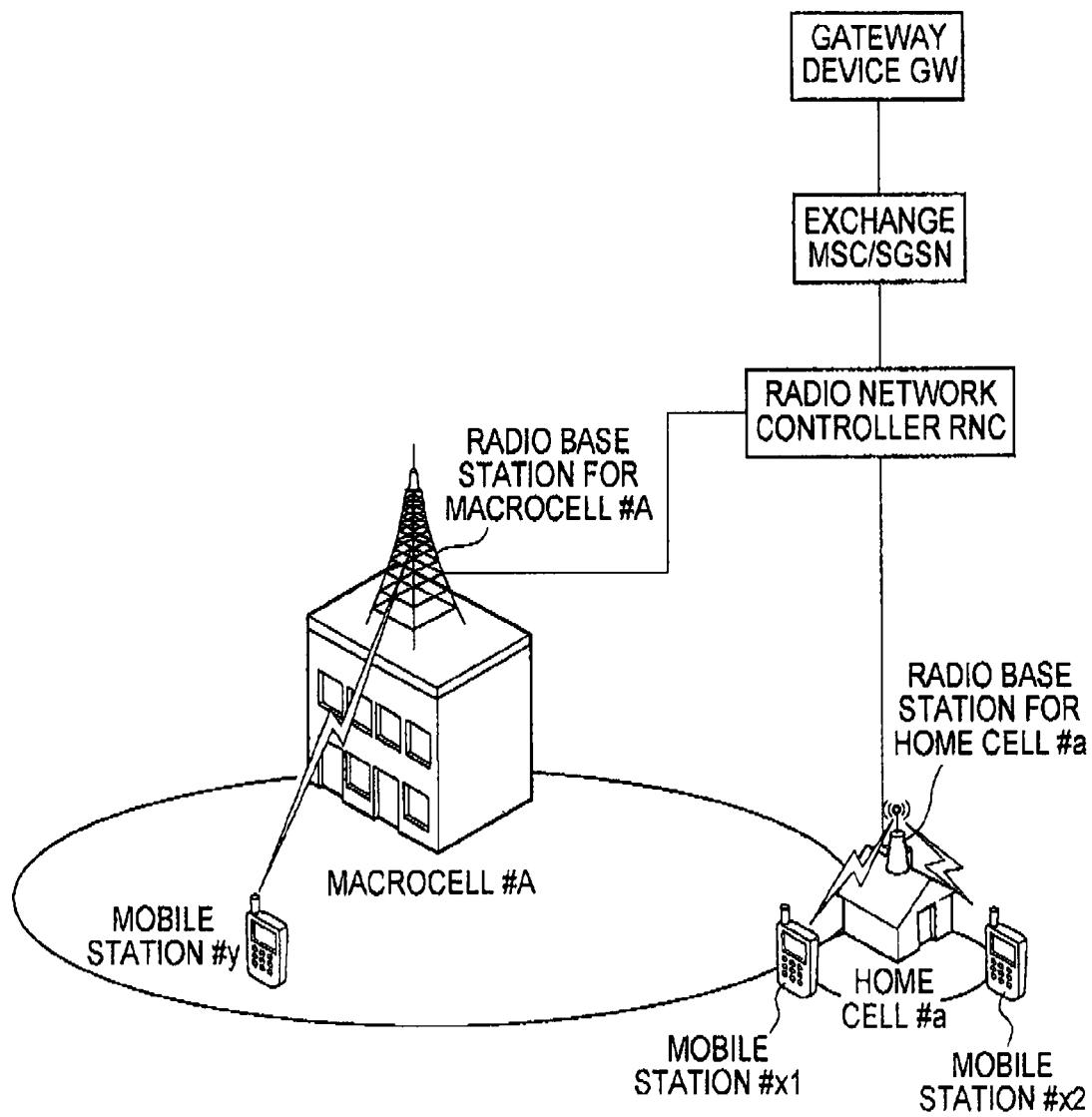
FIG. 8 is an overall configuration diagram of a mobile communication system according to a first modified example of the present invention.

As shown in FIG. 8, in the mobile communication system according to the first modified example, the radio base station for macrocell #A and the radio base station for home cell #a are housed in the radio network controller RNC. Further, the radio network controller RNC is housed in the exchange MSC/SGSN, and the exchange MSC/SGSN is housed in a gateway device GW.

Here, in the mobile communication system according to the first modified example, the state switch 11, the access list manager 12, and the access controller 13 described above may be provided in the radio network controller RNC or in the exchange MSC/SGSN.

SECOND MODIFIED EXAMPLE

Now, a mobile communication system according to a second modified example of the present invention will be described with reference to FIG. 9 while focusing on differences from the above-described mobile communication system according to the first embodiment.

Figure 9:
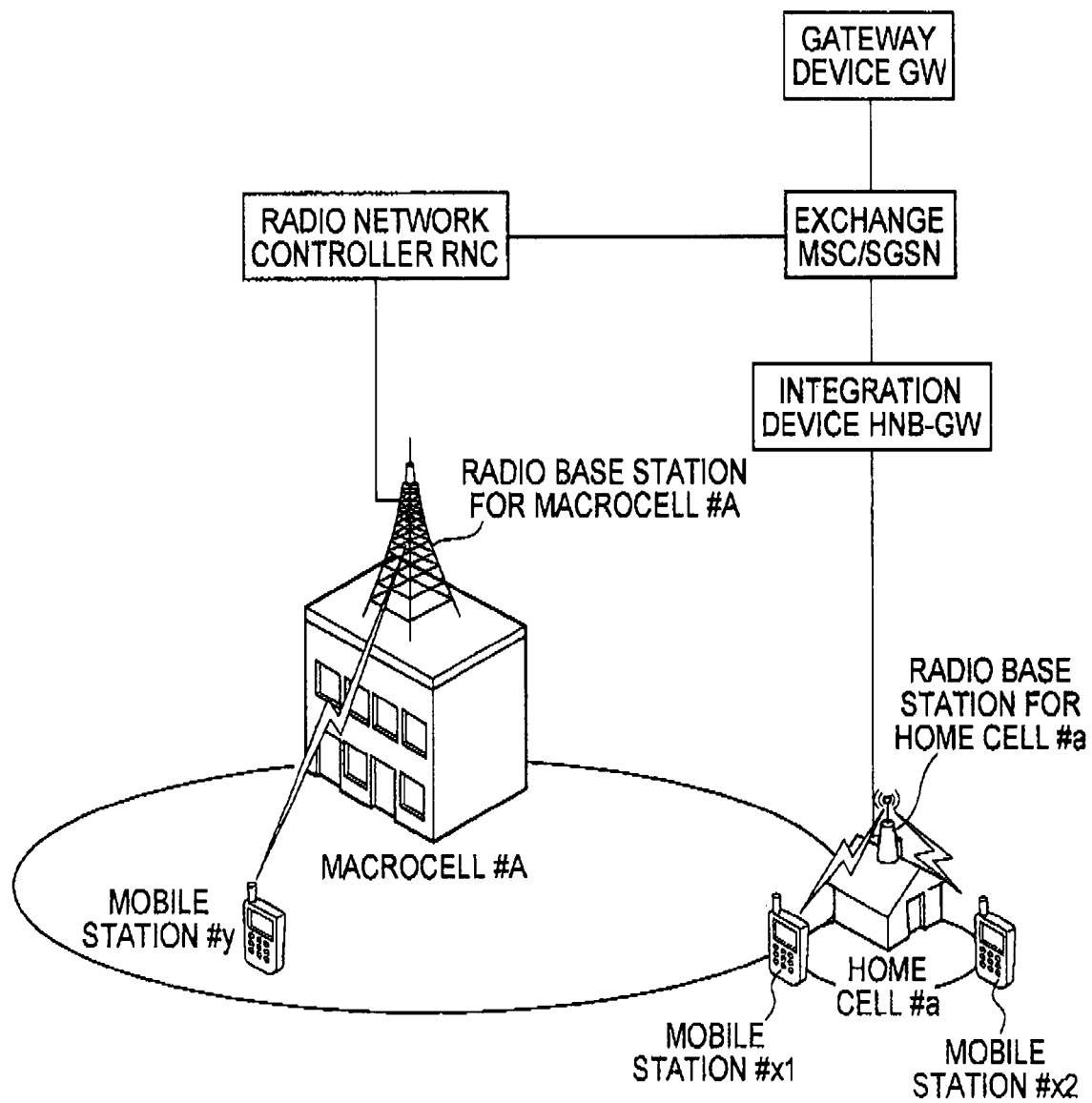
FIG. 9 is an overall configuration diagram of a mobile communication system according to a second modified example of the present invention.

As shown in FIG. 9, in the mobile communication system according to the second modified example, the radio base station for macrocell #A is housed in the radio network controller RNC, and the radio base station for home cell #a is housed in an integration device HNB-GW. Further, the radio network controller RNC and the integration device HNB-GW are housed in the exchange MSC/SGSN, and the exchange MSC/SGSN is housed in a gateway device GW.

Here, in the mobile communication system according to the second modified example, the state switch 11, the access list manager 12, and the access controller 13 described above may be provided in the radio network controller RNC, the integration device HNB-GW, or the exchange MSC/SGSN.

THIRD MODIFIED EXAMPLE

Now, a mobile communication system according to a third modified example of the present invention will be described with reference to FIG. 10 while focusing on differences from the above-described mobile communication system according to the first embodiment.

While the above-described embodiment is based on the example of the mobile communication system of the W-CDMA mode, the present invention is not limited to this mobile communication system. The present invention is also applicable to a mobile communication system of a LTE (Long Term Evolution) mode as shown in FIG. 10, for example.

Figure 10:
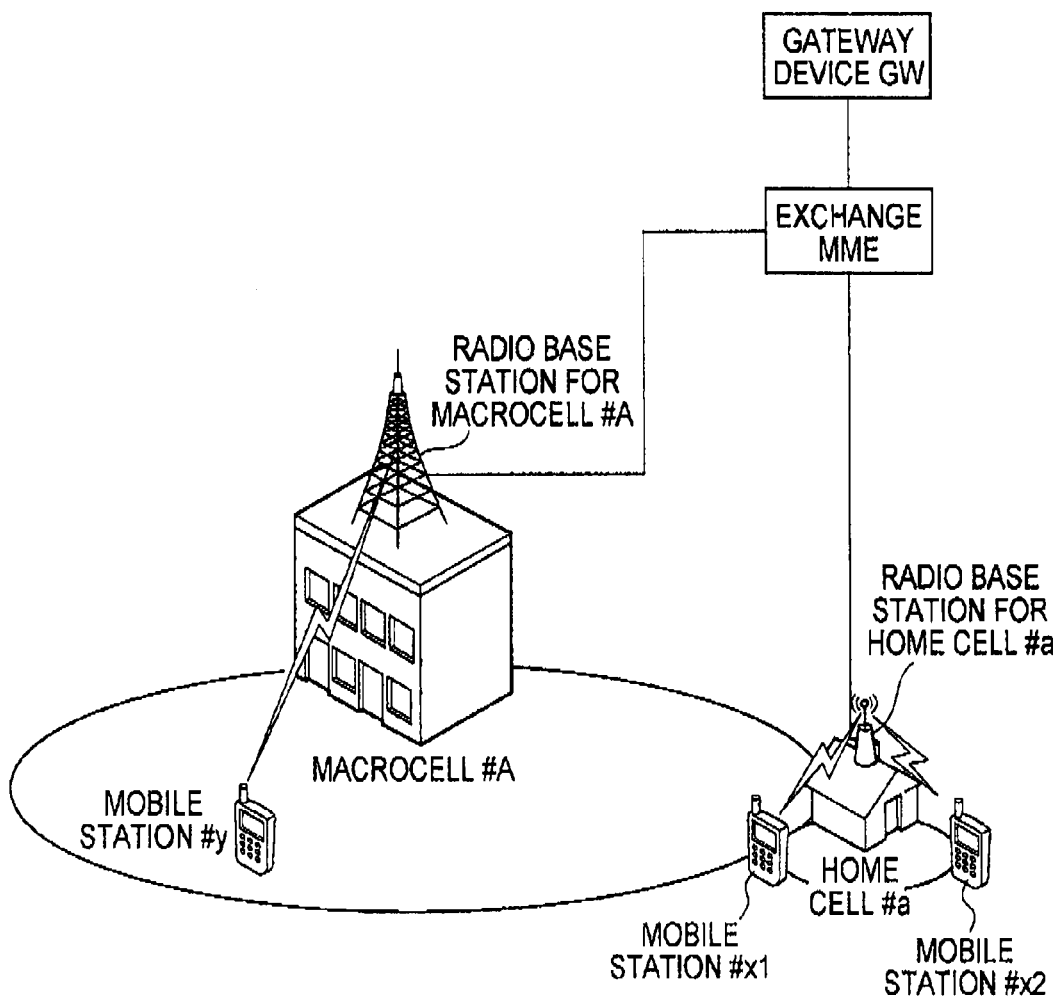
FIG. 10 is an overall configuration diagram of a mobile communication system according to a third modified example of the present invention.

As shown in FIG. 10, in the mobile communication system according to the third modified example, the radio base station for macrocell #A and the radio base station for home cell #a are housed in an exchange MME. Further, the exchange MME is housed in the gateway device GW.

In this case, the functions of the radio base station Nodes and the functions of the radio control station RNC described above are installed in the radio base station eNB or the exchange MME.

Specifically, in the mobile communication system according to the third modified example, the state switch 11, the access list manager 12, and the access controller 13 described above may be provided in the exchange MME.

Meanwhile, if the integration device HNB-GW is provided between the radio base station for home cell #a and the exchange MME, then the state switch 11, the access list manager 12, and the access controller 13 described above may be provided in the integration device HNB-GW.

Note that operation of the above described mobile station UE, the radio base station for home cell, the radio base station for macrocell, the radio network controller RNC, the exchange MME, the exchange MSC/SGSN and the integration device HNB-GW may be implemented by means of hardware, a software module executed by a processor, or a combination of both.

The software module may be provided in any type of storage medium such as an RAM (Random Access Memory), a flash memory, a ROM (Read Only Memory), an EPROM (Erasable Programmable ROM), an EEPROM (Electronically Erasable and Programmable ROM), a register, a hard disk, a removable disk, or a CD-ROM.

The storage medium is connected to the processor so that the processor can read and write information from and to the storage medium. Also, the storage medium may be integrated into the processor. Also, the storage medium and the processor may be provided in an ASIC. The ASIC may be provided in the mobile station UE, the radio base station for home cell, the radio base station for macrocell, the radio network controller RNC, the exchange MME, the exchange MSC/SGSN and the integration device HNB-GW. Also, the storage medium and the processor may be provided in the mobile station UE, the radio base station for home cell, the radio base station for macrocell, the radio network controller RNC, the exchange MME, the exchange MSC/SGSN and the integration device HNB-GW as a discrete component.

Hereinabove, the present invention has been described in detail using the above embodiment; however, it is apparent to those skilled in the art that the present invention is not limited to the embodiment described herein. Modifications and variations of the present invention can be made without departing from the spirit and scope of the present invention defined by the description of the scope of claims. Thus, what is described herein is for illustrative purpose, and has no intention whatsoever to limit the present invention.

INDUSTRIAL APPLICABILITY

As described above, according to the present invention, it is possible to provide a mobile communication method, a radio base station, a radio network controller, an exchange, and an integration device, which are capable of appropriately switching whether or not a radio base station is allowed to perform access control, for implementing flexible home cell deployment on the initiative of a user.

The invention claimed is:

1. A mobile communication method with which a mobile station performs communication by accessing a radio base station, comprising:
  causing the radio base station to operate in any of a closed state of restricting access by mobile stations not having an access right to the radio base station and permitting access by mobile stations having an access right to the radio base station, and a semi-open state of not restricting access by the mobile stations having the access right and the mobile stations not having the access right;
  counting a number of mobile stations located in a cell managed by the radio base station and in a cell around the cell and that are provided with the access right to the radio base station;
  switching the state of the radio base station operating in the semi-open state to the closed state when the number of the mobile stations exceeds a predetermined number; and
  switching the state of the radio base station operating in the closed state to the semi-open state when the number of the mobile stations falls below the predetermined number.

2. The mobile communication method according to claim 1, further comprising:
  switching the state of the radio base station to the closed state when the number of mobile stations accessing the radio base station operating in the semi-open state exceeds the predetermined number; and
  switching the state of the radio base station to the semi-open state when the number of mobile stations accessing the radio base station operating in the closed state falls below the predetermined number.

3. The mobile communication method according to claim 1, further comprising:
  of observing a congestion state in the radio base station;
  switching the state of the radio base station operating in the semi-open state to the closed state when occurrence of the congestion state in the radio base station is observed; and
  switching the state of the radio base station operating in the closed state to the semi-open state when termination of the congestion state in the radio base station is observed.

4. The mobile communication method according to claim 1, wherein
  a mobile station accessing the radio base station and being provided with no access right to the radio base station is instructed to perform any of release of a radio link, a handover to a different cell, and location registration with a different cell when the state of the radio base station operating in the semi-open state is switched to the closed state.

5. A radio base station comprising:
  circuitry configured to:
    control the radio base station to operate in any of a closed state of restricting access by mobile stations not having an access right to the radio base station and permitting access by mobile stations having an access right, and a semi-open state of not restricting access by the mobile stations having the access right and the mobile stations not having the access right;
    count a number of mobile stations that are located in a cell managed by the radio base station and in a cell around the cell and that are provided with the access right to the radio base station;
    switch the state of the radio base station operating in the semi-open state to the closed state when the counted number of the mobile stations exceeds a predetermined number; and
    switch the state of the radio base station operating in the closed state to the semi-open state when the number of the mobile stations falls below the predetermined number.

6. The radio base station according to claim 5, wherein the circuitry is further configured to:
  switch the state of the radio base station to the closed state when the number of mobile stations accessing the radio base station operating in the semi-open state exceeds the predetermined number; and
  switch the state of the radio base station to the semi-open state when the number of mobile stations accessing the radio base station operating in the closed state falls below the predetermined number.

7. The radio base station according to claim 5, wherein the circuitry is further configured to:
  observe a congestion state in the radio base station;
  switch the state of the radio base station operating in the semi-open state, to the closed state when occurrence of the congestion state in the radio base station is observed; and
  switch the state of the radio base station operating in the closed state, to the semi-open state when termination of the congestion state in the radio base station is observed.

8. The radio base station according to claim 5, wherein the circuitry is further configured to:
  when switching the state of the radio base station operating in the semi-open state to the closed state, instruct a mobile station accessing the radio base station and being provided with no access right to the radio base station, to perform any of release of a radio link, a handover to a different cell, and location registration with the different cell.

9. A radio network controller for housing a radio base station therein, the radio network controller comprising:
  circuitry configured to:
    control the radio base station to operate in any of a closed state of restricting access to the radio base station by mobile stations not having an access right to the radio base station and permitting access to the radio base station by mobile stations having an access right to the radio base station, and a semi-open state of not restricting access to the radio base station by the mobile stations having the access right and the mobile stations not having the access right;
    count a number of mobile stations that are located in a cell managed by the radio base station and in a cell around the cell and that are provided with the access right to the radio base station;

switch the state of the radio base station operating in the semi-open state to the closed state when the counted number of the mobile stations exceeds a predetermined number; and switch the state of the radio base station operating in the closed state to the semi-open state when the number of the mobile stations falls below the predetermined number.

10. An exchange for housing a radio base station therein, the exchange comprising:

circuitry configured to:

control the radio base station to operate in any of a closed state of restricting access to the radio base station by mobile stations not having an access right to the radio base station and permitting access to the radio base station by mobile stations having an access right to the radio base station, and a semi-open state of not restricting access to the radio base station by the mobile stations having the access right and the mobile stations not having the access right;

count a counted number of mobile stations that are located in a cell managed by the radio base station and in a cell around the cell and that are provided with the access right to the radio base station;

switch the state of the radio base station operating in the semi-open state to the closed state when the counted number of the mobile stations exceeds a predetermined number; and switch the state of the radio base station operating in the closed state to the semi-open state when the number of the mobile stations falls below the predetermined number.

11. An integration device for housing a radio base station therein, the integration device comprising:

circuitry configured to:

control the radio base station to operate in any of a closed state of restricting access to the radio base station by mobile stations not having an access right to the radio base station and permitting access to the radio base station by mobile stations having an access right to the radio base station, and a semi-open state of not restricting access to the radio base station by the mobile stations having the access right and the mobile stations not having the access right;

count a number of mobile stations that are located in a cell managed by the radio base station and in a cell around the cell and that are provided with the access right to the radio base station;

switch the state of the radio base station operating in the semi-open state to the closed state when the counted number of the mobile stations exceeds a predetermined number; and switch the state of the radio base station operating in the closed state to the semi-open state when the number of the mobile stations falls below the predetermined number.

* * * * *